United States Patent [19]
Oehm

[11] 4,101,146
[45] Jul. 18, 1978

[54] GAS BAG SAFETY DEVICE FOR FLAT STEERING WHEEL

[75] Inventor: Klaus Oehm, Wolfsburg, Germany

[73] Assignee: Volkswagenwerk Aktiengesellschaft, Germany

[21] Appl. No.: 688,403

[22] Filed: May 20, 1976

[30] Foreign Application Priority Data
Jun. 4, 1975 [DE] Fed. Rep. of Germany ....... 2524770

[51] Int. Cl.² ............................................. B60R 21/08
[52] U.S. Cl. ................................... 280/731; 280/743
[58] Field of Search ............... 280/731, 728, 730, 732, 280/743

[56] References Cited
U.S. PATENT DOCUMENTS

| | | | |
|---|---|---|---|
| 3,632,135 | 1/1972 | Chute | 280/731 |
| 3,819,205 | 6/1974 | Dunford | 280/731 |
| 3,827,715 | 8/1974 | Lynch | 280/731 |
| 3,895,823 | 7/1975 | Stephenson | 280/731 |
| 3,944,251 | 3/1976 | Lynch | 280/731 |

*Primary Examiner*—Kenneth H. Betts
*Attorney, Agent, or Firm*—Brumbaugh, Graves, Donohue & Raymond

[57] ABSTRACT

A gas bag safety device is mounted to the spokes of a vehicle steering wheel and has storage compartments extending from the steering wheel in the direction of the steering column for holding a folded gas bag. A gas generator for inflating the gas bag is located on the hub of the steering wheel.

2 Claims, 2 Drawing Figures

GAS BAG SAFETY DEVICE FOR FLAT STEERING WHEEL

BACKGROUND OF THE INVENTION

This invention relates to vehicle safety devices and in particular to gas bag safety devices which are maintained in a folded condition on the steering wheel of the vehicle.

Prior vehicle gas bag safety devices for mounting on the steering wheel of a vehicle have been mounted on the hub of the steering wheel, protruding from the hub toward the vehicle operator. This protrusion of the safety device from the hub may cause interference with the operation of the steering wheel, particularly when the steering wheel is a comparatively flat structure as is typical of smaller automobiles.

In addition, such structures projecting from the steering wheel hub may interfere with the operator's view of the vehicle instruments arranged on the dash board behind the steering wheel.

It is therefore an object of the present invention to provide a new and improved gas bag safety device wherein the mounting of the safety device to the vehicle steering wheel does not cause interference with the operation of the steering wheel or with the operator's view of the vehicle instruments.

SUMMARY OF THE INVENTION

In accordance with the present invention there is provided a safety device for mounting on a vehicle steering wheel, having spokes extending from a hub mounted to a steering column. The safety device includes a gas generator disposed over the hub and a gas bag container, mounted to the spokes and including compartments extending from the steering wheel in the direction of the column for holding a folded gas bag. There is also provided a gas bag arranged in a folded configuration in the compartments and across the gas generator, the gas bag being inflatable in response to gas supplied by the gas generator.

In a preferred embodiment of the invention there is also provided a protective foil covering over the gas bag container, which is designed to be torn open upon inflation of the gas bag.

DESCRIPTION OF THE INVENTION

Figure 1:
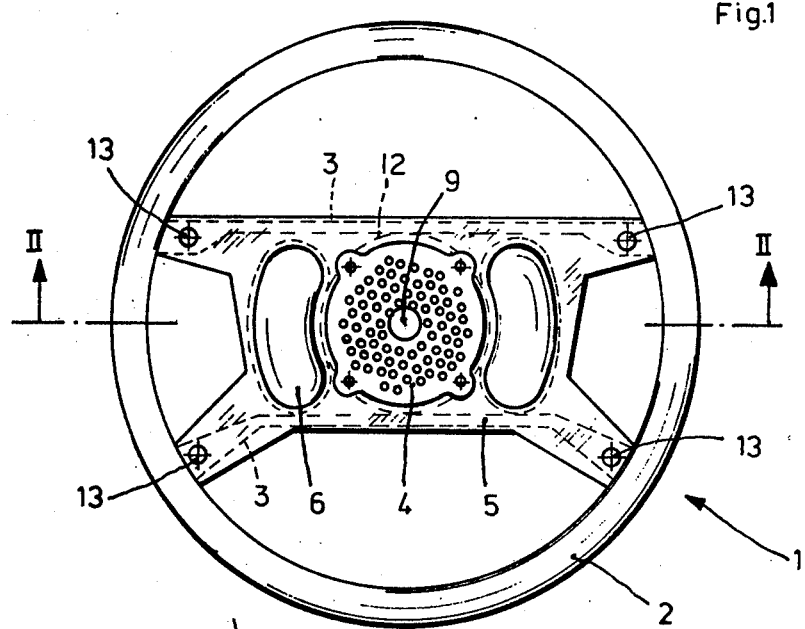
FIG. 1 is a plane view of a steering wheel having a gas bag container and gas generator usable in the present invention.
Figure 2:
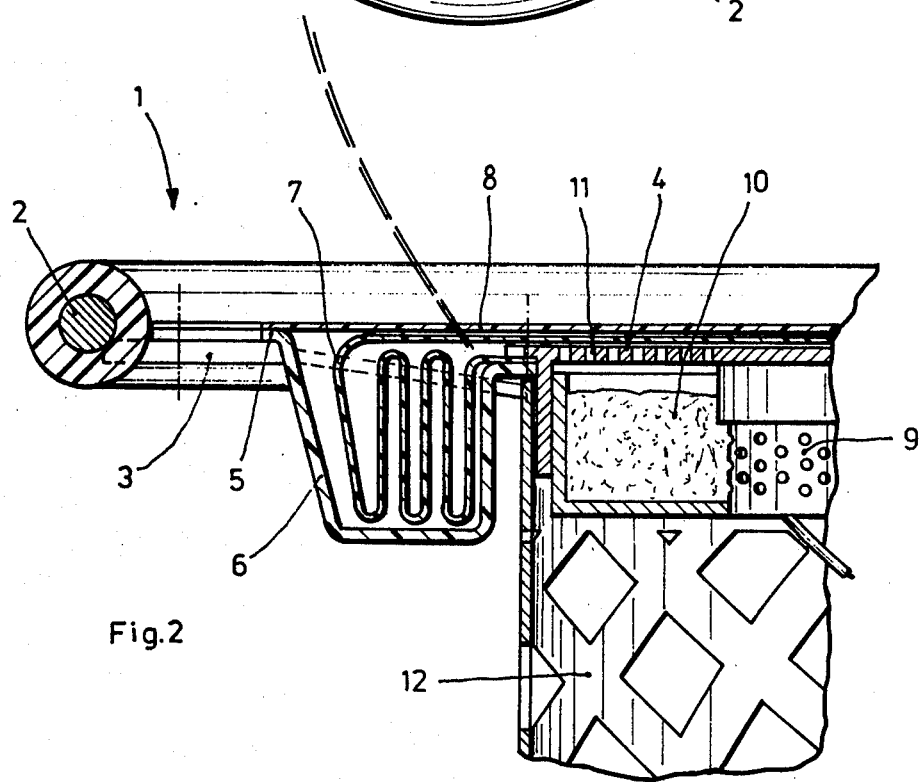
FIG. 2 is a partial cross sectional view of a steering wheel having a safety device in accordance with the present invention.

FIG. 1 is a plane view of an automobile steering wheel 1 having a gas bag container and gas generator in accordance with the present invention. In order to clearly illustrate the gas bag container the drawing of FIG. 1 illustrates the steering wheel without a protective foil cover or gas bag. FIG. 2 illustrates a cross sectional view of the FIG. 1 steering wheel including the gas bag and protective cover. The steering wheel includes a set of spokes 3 which are connected between the steering column 12 and the wheel rim 2. A gas bag container 5 is attached to the steering wheel spokes 3 by means of bolts 13. A gas generator 4 is placed over the steering column and consists of a container with a perforated cover 11 having a propellant 10. At the center of the gas generator container there is provided a priming device 9 for igniting the propellant 10 and causing the discharge of gas into the gas bag.

Gas bag container 5 is provided with compartments 6 which are located symetrically with respect to the center of steering wheel 1 and gas generator 4. As may be seen from the cross sectional view of FIG. 2 compartments 6 are arranged to extend from the plane of the steering wheel in the direction of steering column 12. A gas bag 7 is arranged over gas generator 4 and folded to fit within compartment 6. A protective cover 8 is provided over the folded gas bag 7 and gas generator 4. The protective cover 8 is usually made of foil and is designed to prevent damage, exclude moisture, and tear open easily when gas bag 7 is inflated by gas from gas generator 4.

As may be seen from the cross sectional view of FIG. 2, a principle advantage of the present invention is the fact that the entire assembly, including gas bags, container, and gas generator is mounted below the plane of the steering wheel so as not to obstruct the operation of the steering wheel by the vehicle operator. Another advantage of the invention is that the arrangement which includes the entire gas bag, gas generator, and housing may conveniently be attached to the steering wheel of a vehicle after assembly of the vehicle and is not necessarily an integral part of the steering wheel assembly. The safety device in accordance with the present invention can therefore be installed as a retrofit safety device on existing vehicles.

The present invention is used in connection with an apparatus to detect the occurrence of a collision, such as a device which detects a rapid deceleration. When the occurrence of an accident is detected, an electrical signal may be provided to trigger the priming device 9 located in gas generator 4. Priming device 9 causes the occurrence of a combustion or other reaction in the propellant charge 10 of gas generator 4 and thereby supplies gas which causes the rapid inflation of folded gas bag 7 as indicated by dotted lines in FIG. 2. Inflation of gas bag 7 causes a tearing open of protective cover 8 allowing gas bag 7 to be applied against the vehicle operator to restrain the operator thereby preventing serious injury.

While there has been described what is believed to be the preferred embodiment of the invention, those skilled in the art will recognize that other and further modifications may be had thereto without departing from the true spirit of the invention, and it is intended to claim all such modifications as fall within the true scope of the invention.

I claim:

1. A safety device for mounting on a vehicle steering wheel, having a rim connected to a steering column by spokes, comprising:
    a gas generator disposed over said column;
    a gas bag container, mounted to said spokes and including compartments extending between said spokes and behind said steering wheel in the direction of said column for holding a folded gas bag; and
    a gas bag, arranged in a folded configuration in said compartments and across said gas generator, said gas bag being inflatable in response to gas supplied by said gas generator.

2. A safety device as specified in claim 1 wherein there is provided a protective cover over said gas bag container, which cover is torn open upon inflation of said gas bag.

* * * * *